United States Patent
Roberts

(10) Patent No.: US 6,503,337 B1
(45) Date of Patent: Jan. 7, 2003

(54) REMOVAL OF OIL AND CHLORIDE FROM OIL CONTAMINATED MATERIAL

(75) Inventor: Brian G. Roberts, Stillwater lake (CA)

(73) Assignee: BGR Oilfield Services, Inc., Bedford (CA)

( * ) Notice: Subject to any disclaimer, the term of this patent is extended or adjusted under 35 U.S.C. 154(b) by 0 days.

(21) Appl. No.: 09/459,760

(22) Filed: Dec. 13, 1999

Related U.S. Application Data

(60) Provisional application No. 60/112,548, filed on Dec. 16, 1998, and provisional application No. 60/133,798, filed on May 11, 1999.

(51) Int. Cl.[7] .................................................. B08B 3/04
(52) U.S. Cl. .................. 134/40; 134/22.14; 134/22.19; 166/304; 166/311; 510/188
(58) Field of Search ................ 134/21, 22.14, 134/22.19, 40; 166/304, 311; 510/188

(56) References Cited

U.S. PATENT DOCUMENTS

| | | | |
|---|---|---|---|
| 4,645,608 A | | 2/1987 | Rayborn ..................... 252/8.51 |
| 4,681,165 A | * | 7/1987 | Bannister ..................... 166/312 |
| 5,213,625 A | | 5/1993 | Van Slyke ..................... 134/26 |
| 5,215,596 A | * | 6/1993 | Van Slyke ..................... 134/26 |
| 5,344,493 A | * | 9/1994 | Jackson ........................... 134/1 |
| 5,723,423 A | | 3/1998 | Van Slyke ................... 510/188 |
| 5,788,781 A | | 8/1998 | Van Slyke ..................... 134/40 |
| 5,833,756 A | * | 11/1998 | Haegel et al. ................ 134/10 |
| 5,874,386 A | * | 2/1999 | Chan et al. .................. 507/211 |
| 5,928,433 A | | 7/1999 | Jahnke et al. .................. 134/2 |
| 6,173,776 B1 | * | 1/2001 | Furman et al. ............. 166/279 |
| 6,176,243 B1 | * | 1/2001 | Blunk ..................... 134/22.19 |

FOREIGN PATENT DOCUMENTS

CA      2179720      6/1995

* cited by examiner

*Primary Examiner*—Randy Gulakowski
*Assistant Examiner*—J Smetana
(74) *Attorney, Agent, or Firm*—Armstrong, Westerman & Hattori, LLP

(57) ABSTRACT

A method for chemically removing hydrocarbons from oil contaminated material is described. The method comprises contacting the material containing the oil with a combinations of surfactants in an oil carrier similar to or identical to the oil to be removed. This process avoids the use of water. Therefore the process does not compromise the quality of the oil by having water as a contaminant and thus eliminating the possibility of oil contaminated water getting into the environment. In certain examples, when the process is used to remove oil from land based well bore cuttings, the processed well bore cuttings contain high levels of chlorides, which is an environmental problem. In such examples the method also includes contacting the well bore cuttings with a solution of dioctyl sodium sulfosuccinate in water to reduce the chloride concentration. An apparatus designed for this purpose is also described.

20 Claims, 2 Drawing Sheets

REMOVAL OF OIL AND CHLORIDE FROM OIL CONTAMINATED MATERIAL

This Application claims benefit to Provisional No. 60/112,548 filed Dec. 10, 1998 which claims benefit to Provisional No. 60/133,798 filed May 11, 1999.

The present invention relates to a method of removing oil from oil contaminated material. This invention also relates to a method of removing chloride from the oil contaminated material after the oil has been removed. The present invention also relates to an apparatus designed for this purpose.

BACKGROUND OF THE INVENTION

The present invention is a treatment method best described as a chemically induced hydrocarbon extraction process for the removal of oil from oil contaminated material. For example, oil contaminated well bore cuttings are created when oil based drilling fluid (mud) is utilized in the drilling process during oil exploration. The drilling fluid (drilling mud) is injected into the bore hole during the drilling process for the purposes of lubrication, cooling, controlling sub-surface pressure to prevent blowouts, stabilization and to assist in the removal of cuttings from the hole. The combination of drilling fluid (mud) and soil is brought to the surface where the oil based drilling mud is separated from the well bore cuttings and the oil based mud reused. During the separation process a considerable amount of fines are introduced into the drilling mud portion. This drilling mud can be reused until the concentration of solids exceeds in most cases 15 to 16 percent, at which time the mud has to be reworked. The resulting well bore cuttings containing unwanted oil are considered hazardous waste and present a large environmental problem during disposal as well as the safety hazards associated with handling combustible material.

Various technologies have been offered in an attempt to safely, efficiently and cost effectively remove the oil from well bore cuttings such as: incineration, thermal desorption (indirect fired), dirt burning (direct fired), screening and centrifugation, deep well injection, water based solvent washing solutions, and land farming. Incineration, thermal desorption, dirt burning are expensive as well as dangerous due to the real potential for explosion. Screening and centrifugation has proved to be ineffective as these methods are only capable of reducing oil concentrations to 10 to 15% by weight and the regulatory agencies, for example in the North Atlantic, are requiring less than 1% by weight remaining in the well bore cuttings before. discharge overboard in offshore oil drilling. Deep well injection is expensive and a questionable environmental solution. Water based solvent washing solutions appear to be effective in treating well bore cuttings where water based drilling fluids are used but not when oil based drilling fluids are used. This process is expensive and creates a need for water treatment. Land farming is expensive and takes a number of years to complete the process.

The trend in the industry is to lower discharge limits for hydrocarbon contaminated well bore cuttings. This has already been realized in the North Sea and in the Gulf Of Mexico. In the North Atlantic for example, the regulations are currently at the 15% hydrocarbon discharge criteria. The level will be reduced to 1% by weight in the near future.

This invention also provides a method for the reduction of chlorides in the well bore cuttings that are generated during land based drilling or exploration which commonly reach concentration in excess of 18000 ppm. The two most important criteria that have to be met when looking at landfill well bore cuttings in, for example, the province of Alberta, are reducing oil concentrations to less than 2.5% by weight and chlorides to less than 2500 ppm. When the oil based drilling fluid is constructed, calcium chloride or potassium chloride is commonly used for structural stabilization of the well bore hole.

There is thus a need in the industry to reduce the level of oil in oil contaminated material in the oil field. There is also a need to reduce the level of chlorides in land based drilling fields.

SUMMARY OF THE INVENTION

Thus, according to the present invention there is provided a method of removing oil from oil contaminated solids-containing material. This invention also relates to a method of removing chloride from the oil-depleted material, the oil contaminated solids-containing material after the oil has been removed. This invention also relates to an apparatus designed to accomplish the methods of the present invention.

In one embodiment of the present invention there is provided a process to extract oil from oil contaminated well bore cuttings so as to produce clean cuttings.

This invention further provides a quality of oil that can be reused in the construction of oil based drilling fluid or recycled for other purposes, such as fuel.

In a further embodiment of the present invention there is also provided a method to reduce chloride concentration to a level for safe land fill disposal during land based drilling operations. This can only be accomplished after the oil has been removed from the soil particles, which will then expose the more difficult to remove chlorides, that are attached to the soil particles that make up the well bore cuttings.

The removal of the contaminating oil in the well bore cuttings is accomplished by contacting the cuttings with a combination of surfactants in an oil carrier.

Thus according to one embodiment of the present invention there is provided a method of extracting oil from oil contaminated solids-containing material comprising:

mixing the oil contaminated solids-containing material with a combination of one or more surfactants in an oil carrier to provide a solids-containing treated material; and subjecting the solids-containing treated material to one or more separating steps to extract oil therefrom and to provide an oil-depleted solids-containing material.

In a further embodiment of the present invention the method further comprises a step of removing the chloride from land based oil contaminated material.

In this embodiment there is provided a method of extracting oil and chloride from oil contaminated material comprising:

mixing the oil contaminated solids-containing material with a combination of one or more surfactants in an oil carrier to provide a solids-containing treated material;

subjecting the solids-containing treated material to one or more separating steps to extract oil therefrom and to provide an oil-depleted solids-containing material; and treating the oil-depleted solid-containing material to reduce the concentration of chloride ions in the oil-depleted solid-containing material.

This invention also comprises an apparatus for achieving the methods of the present invention. In the embodiment of the present invention, which comprises the extraction of oil from oil contaminated material the apparatus comprises:

a means for mixing the oil contaminated solids-containing material with a surfactant-containing treating liquid to provide a solids-containing treated material; and means for subjecting the treated materials to one or more separating steps to extract oil therefrom and provide an oil-depleted solid-containing material.

In the embodiment of the present invention which comprises the further step of separating the chloride from the treated material, the apparatus of the present invention further comprises:

a further mixing means;

a means to transport the oil-depleted material into the further mixing means;

a chemical input means for introducing a composition comprising one or more surfactants in a water carrier into the further mixing means; and a separation means for separating the water carrier, which now includes chloride ions, from the further treated material.

DETAILED DESCRIPTION OF THE DRAWINGS

DESCRIPTION OF PREFERRED EMBODIMENT

Figure 1:
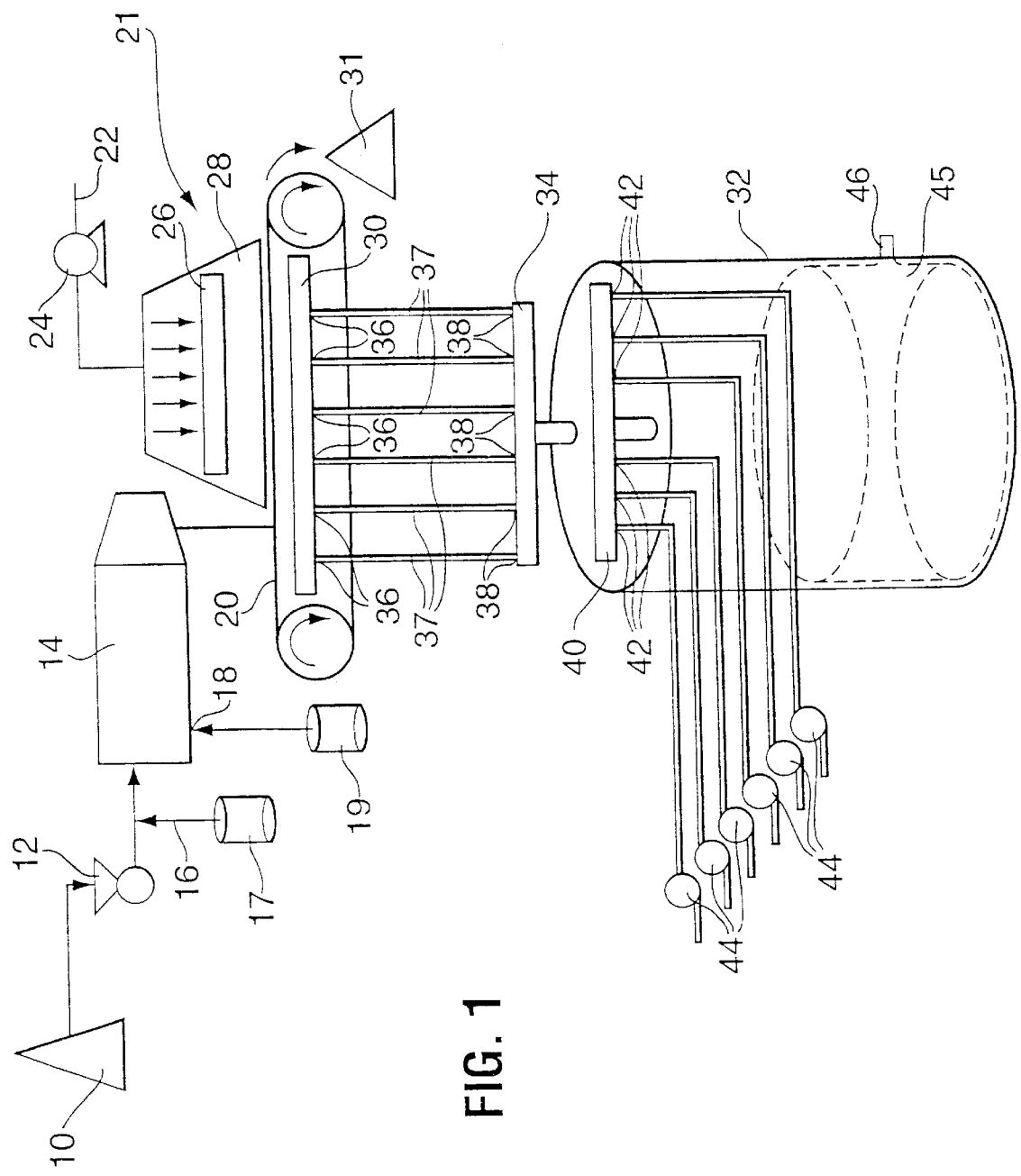
FIG. 1 shows the material flow diagram for hydrocarbon treatment.

The present invention relates to a method of removing oil from oil contaminated material. This invention also relates to a method of removing chloride from the oil contaminated material after the oil has been removed. The present invention also relates to an apparatus designed for this purpose.

According the present invention the apparatus and process can be used to remove contaminated oil from a variety of contaminated materials. For example oil can be removed from well bore cuttings, processed sand, oil tank bottoms, slop oils, and fixated or stabilized drilling muds to name only a few examples. Oil can also be removed from pits that have served as a holding reservoir for oil contaminated materials. The oil contaminated material can also include under flow fines, which are fines removed from a combination of well bore cuttings and drilling mud that is brought up to the surface. The concentration of oil in the solid material to be treated can range from about 5% to about 60%; however, concentrations of from about 12% to about 30% are more typical in the art.

According to the present invention the oil contaminated material is treated with a composition comprising one or more surfactants in an oil carrier.

In one embodiment of the present invention the surfactant or combination of surfactants have a hydrophilic—lipophilic balance (HLB) of less than 10. The HLB is a ratio of the water/oil affinities of an emulsifier. A surfactant with a HLB of 1 to 10 is more soluble in oil than in water. A surfactant with a HLB of 10 to 20 is more soluble in water than in oil. Thus, as the present invention avoids the presence of water, although of course there will always be some water present in the system, it is preferred that the surfactants of the present invention have an HLB of less than 10. In one embodiment of the present invention the surfactants have a HLB value of less than 8. These surfactants are also sometimes know as lipophilic surfactants.

In one embodiment of the present invention the surfactants are a combination of saturated fatty acid alcohols.

In a further embodiment of the present invention the surfactants are a combination of ethoxylated lauryl alcohol, lauryl alcohol and myristic alcohol.

In one embodiment of the present invention the surfactants are a combination of the following:

myristic alcohol 1 to 5% (w/w);

lauryl alcohol 1 to 5% (w/w); and ethoxylated lauryl alcohol 10 to 30% (w/w).

This combination of surfactants is sold under the name Rhodasurf LA-3 by Rhone Poulenc Canada Inc. Suitable surfactants are also available from other manufactures.

The surfactant combination is dissolved or dispersed in a sufficient quantity of an appropriate oil as a carrier. In one embodiment of the present invention the surfactant combination is dissolved or dispersed in the oil carrier at a concentration range of about 0.25% to about 20% by volume. In another embodiment of the present invention the concentration of surfactant in the oil carrier is from about 0.5% to about 4%.

The oil carrier should be selected from a hydrocarbon within the range of C 12 to C 22, which could include the following:

Synthetic oils—examples are IPAR 3 and LTMO (low tox mineral oil)

Non-synthetic oils—examples are mineral oil, kerosene, diesel and cutter stock.

In one embodiment the carrier oil is identical to the oil present in the well bore cuttings to maintain consistency for reuse as a drilling mud.

The volume of surfactant containing oil required to treat one ton of well bore cuttings would range from about 50 ml to about 1000 ml. In a further embodiment of the present invention the volume of surfactant containing oil required to treat one ton of well bore cuttings would range from about 100 ml to about 200 ml. In some embodiments of the present invention the solid material is pre treated with surfactant in the oil carrier. In this pre treatment step about one ton of material is treated with from about 6 to about 10 liters of chemical composition, containing about 1% surfactant.

The surfactant containing oil would contact the oil contaminated material at a temperature within the range of 10° C. to 70° C.

The contact time should range from 0.5 seconds to one hour or greater.

Following the mixing of the surfactant containing oil with the oil contaminated material, the oil is separated from the treated material.

According to the present invention the separation step is accomplished by mechanical means, such as vacuum filtration, air stripping, centrifugation, and cyclones, or a combination of any of these means.

In one embodiment the invention the material to be treated is first heated to from about 40° C. to about 60° C. Any known method can be used to heat the oil contaminated solids-containing material. The surfactants in the oil carrier can be added during this heating step or following said heating step. In one embodiment the surfactant and oil carrier can be heated before it is mixed with the oil contaminated solids-containing material to provide the required heat. The oil is then separated from the material by vacuum filtration. In this embodiment the material can be placed on a horizontal vacuum belt. In this embodiment of the present invention the vacuum belt can be comprised of at least two sections, a vacuum section and a drying section. The vacuum section, which would be shorter than the drying section, would remove a substantial portion of the oil from the contaminated material at a vacuum of about 5 to about 9 inches of mercury. The remaining material would be exposed to dry heat from above at temperatures ranging from about 100° C. to about 160° C. Additional oil would be removed by vacuum from below at from about 5 to about 9 inches of mercury. It may also be necessary in this embodiment to break up the cake following the first vacuum treatment before exposing the material to the drying step.

In some embodiments it may not be necessary to include the first vacuum step. In this embodiment 4400 cubic feet per minute of warmed air is directed toward the solids-containing treated material. In this embodiment, as depicted in FIG. 1, there are six vacuum exhausters each pulling a volume of air of about 850 cfm, for a total of 5100 cfm, drawing a vacuum that will not exceed 9 inches of mercury.

The amount of oil removed is directly proportional to the time of exposure to the combination of hot air and vacuum. With the addition of the hot air during the extraction process, we were able to achieve less than 0.5% oil remaining in the oil-depleted solids-containing material. In this embodiment of the present invention some form of air filtration, such as a carbon filter, may be required to capture air born oil particles in the vacuum exhaust.

In a further embodiment of the present invention the oil is separated from the solids-containing treated material using centrifugation. In this embodiment the invention the material to be treated can first be heated to from about 40° C. to about 60° C. The surfactants in the oil carrier can be added during this heating step or following said heating step. Although if centrifugation is used as the separation technique, heating may not be necessary. The oil is then separated from the material by centrifugation. In a continuous flow centrifuge about 3 to about 9 tons of material can be treated per hour, at centrifugation speed ranging form about 3200 rpm to about 6000 rpm, depending on the type of centrifuge used. Any suitable centrifuge known in the art can be used to separate the solids-containing treated material from the oil. It is preferred that the centrifuge is a continuous centrifuge, for example a decanter centrifuge. For small samples a Sharples P660 centrifuge can be used and the centrifugation speed can be up to about 6000 rpm. For large samples, as defined in Example 4, an Alfa Laval DMNZ 418 FTVB decanter centrifuge can be used. In this example, the centrifuge is run at about 3200 rpm.

In yet a further embodiment of the present invention the oil is separated from the solids-containing treated material using first a centrifugation step, as described above, followed by a vacuum drying step, also as previously described. This initial centrifugation treatment should remove all but from about 2% to about 3% of the oil from the material. Additional oil can be removed using a vacuum drying step. The oil remaining after this further vacuum drying step can be reduced to at least 1%, or even as low as 0.5%.

Figure 2:
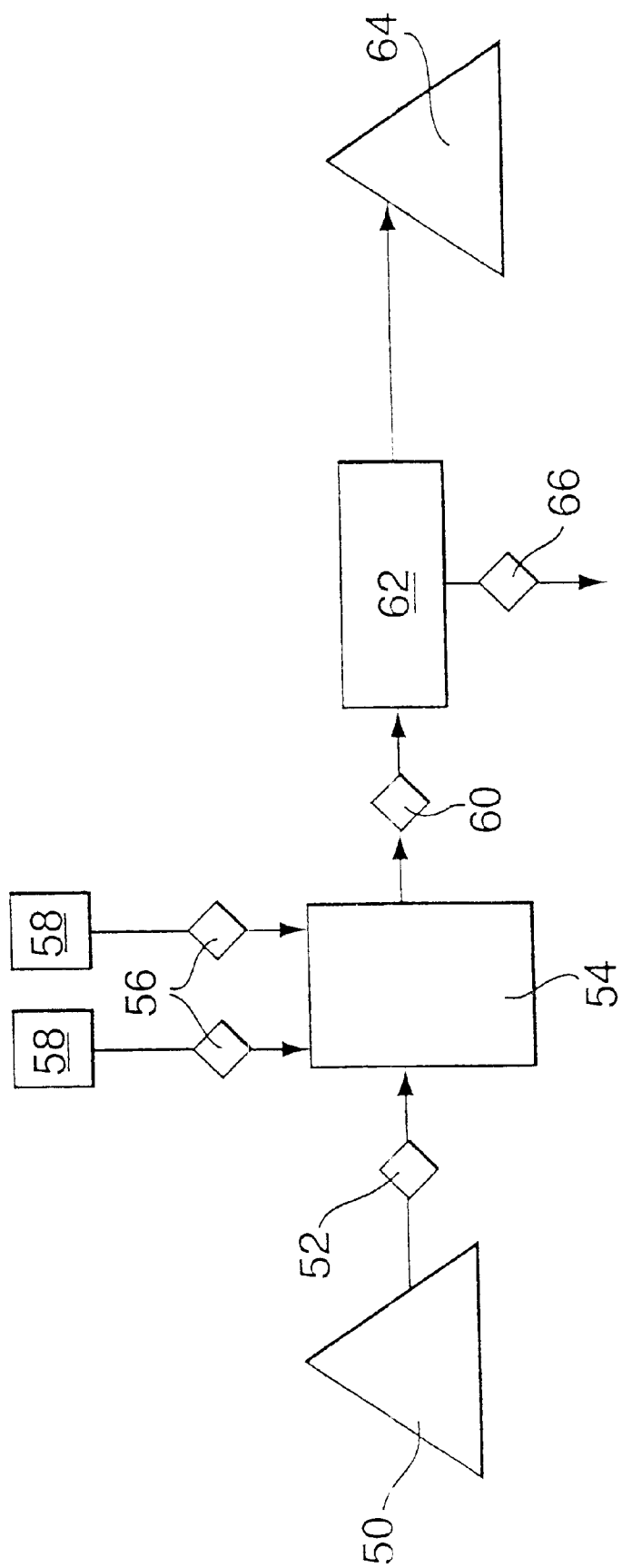
FIG. 2 shows the material flow diagram for chloride treatment.

The apparatus used to practice the present invention is shown in FIGS. 1 and 2. FIG. 1 shows the apparatus used for the removal of oil from the oil contaminated material. FIG. 2 shows the apparatus used for the removal of chloride from the material after the oil has been removed, the oil-depleted solids-containing material.

As depicted in FIG. 1 the untreated solids (10) are pumped using a suitable pump means (12) into a horizontal decanter centrifuge (14). Prior to entering the centrifuge the untreated solids are mixed with the surfactant and oil carrier by a chemical/carrier oil injection means (16), from a chemical/carrier oil reservoir (17). According to the present invention a single or double piston concrete/grout pump can be used as the suitable pump means. In some embodiments of the present invention additional chemical material can be added as a pretreatment or conditioning step, while the solid material to be treated is being pumped. For this purpose a Master Builders Technologies POWERCRETER (TM) PRO pump has been found to be particularly useful as it has mixing capabilities. Once the surfactant has been added to the solid material there is a drop in viscosity of the solid material, which improves its pumping ability.

From the centrifuge the liquid oil is collected for re-use from a valve means (18) in the centrifuge into a suitable container (19). The solid material is discharged from the centrifuge onto a horizontal belt filter (20) of a vacuum extraction means, referred to generally by reference number 21. The belt filter according to this embodiment of the present invention has a surface area of approximately 23 square feet.

The vacuum extracter comprises an air inlet port (22) through a blower (24) that directs the air over heating elements (26), preferable electric heating elements located in a hood (28). The volume of the air entering the hood is about 4400 cfm (cubic feet per minute). The heating elements are located directly above the belt filter. Preferable the heating elements are about 10 to about 16 inches above the belt filter. The air is heated to from about 100° C. to about 160° C. as it comes over the heaters. In one embodiment of the present invention the air is heated to about 145° C. The vacuum tray (30), which initially collects the oil is located beneath and in direct communication with the vacuum belt.

The treated solids (31) are collected at the end of the vacuum belt and can then be released into the environment. The material after treatment by the present invention meets or exceeds present government standards.

The oil removed from the vacuum filtration step is directed to an impingement tank (32) by an inlet manifold (34). The air/oil combination is drawn from the vacuum tray via numerous outlet port (36) through suitable conduits (37) into the inlet manifold through corresponding inlet ports (38). Air is drawn out of the impingement tank through an outlet manifold (40) comprising numerous outlet ports (42) through suitable conduits (43). Numerous vacuum pumps (44), in direct communication with the outlet manifold, provide the required vacuum. In one embodiment of the present invention as depicted in FIG. 1, there are 6 separate pumps pulling a total vacuum of from about 5 to about 9 inches of mercury. According to the present invention it was found that 6 such vacuum exhausters were needed to create the required vacuum to reduce the contaminating oil in the solid material to about 1%, or less than 1%. More or less vacuum exhausters can be used as needed. Air from the system is exhausted to the atmosphere. In one embodiment of the present invention the system also includes carbon filter in the exhaust (not shown).

The oil and possibly some fine solids collects in the bottom of the impingement tank in a separate but connected filtrate tank (45), shown in phantom, which contains a drain (46) to collect the oil for re use.

Depending upon the source of the material to be treated in may be necessary to include in the treatment system pre filters to remove large solids.

The apparatus described above can treat from about 3 to 9 tons per hour. The results will improve, lower residual oil left in the treated solids, if the system is run at from about 3 to 4 tons per hour. The apparatus described above can be scaled up or down to meet a higher of lower load requirement. In the apparatus described above the load can be increase by increasing the size of the belt filter and correspondingly increasing the number of vacuum pumps to provide approximately the same vacuum of from about 5 to about 9 inches of mercury.

In land based oil drilling, calcium chloride or potassium chloride is commonly used for structural stabilization of the well bore hole. Thus the oil contaminated material from a land based oil well will also have a high concentration of chloride ions that must be remove before the treated material can be released into the environment. At present, the province of Alberta requires that the chlorides be reduced to less than 2500 ppm. Thus, a further embodiment of the present invention provides a method and apparatus for removing chlorides from the treated material.

According to this further embodiment well bore cuttings from which the contaminate oil has been extracted is contacted with a solution of about 0.25% to about 15% by volume, of a surfactant in water. In one embodiment of the present invention the surfactant is dioctyl sodium sulfosuccinate.

The preferable temperature range of the water would be 10° C. to 100° C.

The volume of water required would be in the range of 1 to 20 times the volume of oil extracted well bore cuttings to be treated.

The preferable volume of water would be 3 times the volume of the oil extracted well bore cuttings to be treated.

The contact time would range from 1 minute to one hour.

The water is mechanically extracted from the cuttings by vacuum extraction, centrifugation, cyclones, etc.

The preferable mechanical extraction would be accomplished by vacuum extraction.

In one embodiment of the present invention, as shown in FIG. 2, the solids (50), previously treated to remove residual oil, are pumped by a pumping means (52) into a mixing tank (54). Into the mixing tank are pumped by a pumping means (56) separately, or as a mixture, the dioctyl sodium sulfosuccinate and hot water. The surfactant and water are held in one or more holding tanks (58), as is required. The treated material is then pumped by a further pumping means (60) onto a vacuum filter system (62), similar to that described above. The mud and cuttings (64), treated to remove both hydrocarbons and chlorides, are collected at the end of the vacuum belt. The waste water is pumped by a further pumping means (66) to a suitable water treatment system to remove the chlorides from the waste water.

EXAMPLES

Example 1

Removal of Oil and Chloride Ions from Land Based Well Bore Cuttings

Samples were obtained from PanCanadian. The concentration of oil in the samples prior to treatment was about 12.5%. The concentration of chloride in the untreated samples was about 16,900 mg/kg.

In this example the combination of surfactants for the removal of oil is as follows:
 myristic alcohol 1 to 5% (w/w)
 lauryl alcohol 1 to 5% (w/w)
 ethoxylated lauryl alcohol 10 to 30% (w/w) dissolved in a sufficient quantity of the oil in the well bore cutting.

The sample, 100 ml, was treated with 15 ml of the surfactant/carrier oil combination. After mixing the oil was extracted using vacuum filtration generally as described above. The results are shown in Table 1.

TABLE 1

Summary of Test Results for Well Bore Cutting from PanCanadian

| Sample ID. | Description of Treatment Process | % Oil or Chloride (mg/kg) in Sample |
|---|---|---|
| PanCanadian-1 | No Treatment-Untreated analysis | 12.5 |
| PanCanadian-2 | No Treatment-Untreated analysis | 12.5 |
| PanCanadian-3 | No Treatment-Untreated Chloride Analysis (mg/kg) | 16,900 |
| PanCanadian-2 | Hydrocarbon extraction. | 2.5 |
| PanCanadian-2 | Hydrocarbon extraction. | 2.6 |
| PanCanadian-2 | Hydrocarbon extraction. | 2.9 |
| PanCanadian-2 | Hydrocarbon extraction. | 2.5 |
| PanCanadian-2 | Hydrocarbon extraction. | 2.5 |
| PanCanadian-2 | Hydrocarbon extraction. | 2.5 |
| PanCanadian-2 | Hydrocarbon extraction. | 2.0 |
| PanCanadian-2 | Hydrocarbon extraction. | 2.0 |
| PanCanadian-3 | Chloride reduction using only the hydrocarbon extraction process (chloride analysis mg/kg). | 4,950 |
| PanCanadian-3 | Chloride reduction using the hydrocarbon extraction process followed by the chloride reduction process (chloride analysis mg/kg). | 2,600 |

Oil concentration was tested in an OFI 50 ml Retort Analyser, using standard procedures. Chloride analysis were done using standard techniques.

Example 2

Comparison of Different Oil Carriers and Addition of Underflow fines

To a 100 ml sample of land based cuttings was added 15 ml of the surfactant/oil carrier, containing 1% surfactant mixture, as in Example 1. The mixture was heated to about 40° C. and the oil removed by vacuum extraction, generally as described above.

Two types of oil carriers were used, either a synthetic oil, sold under the name IPAR3 (TM) and a non-synthetic oil, kerosene. As shown in Table 2 both are effective in reducing the oil concentration in the treated solids to less than 1%.

As previously discussed, as the drilling mud is used it is first cleaned before reuse by passing the mud through a screen to remove fines or cuttings. As the mud is re used the solid concentration increases. When the concentration becomes to high to allow reuse, the mud can be cleaned further by centrifugation to remove additional solids or fines. The solid material collected by centrifugation is know in the art as under flow fines. This example also shows the effectiveness of the present process in adding small amounts of the under flow fines to the cuttings, prior to cleaning by the present process. As seen in Table 2, 10% or 20% of under flow fines can be added to the system without detracting from the efficiency of the system.

TABLE 2

Summary of Results Using Different Oil Carrier and Adding Underflow Fines

| Material Tested | water (ml) | Oil (ml) | % Oil remaining |
|---|---|---|---|
| (1) Cuttings Untreated | 5 | 15 | 12.6 |
| (2) Treated cuttings (with IPAR3) | 2 | 1.5 | 0.9 |
| (3) Treated cuttings | 1 | 0.5 | 0.29 |

TABLE 2-continued

Summary of Results Using Different Oil
Carrier and Adding Underflow Fines

| Material Tested | water (ml) | Oil (ml) | % Oil remaining |
|---|---|---|---|
| (with Kerosene) | | | |
| (4) Treated cuttings (with IPAR3) (plus 20% underflow-fines) | 1 | 2 | 1.18 |
| (5) Treated cuttings (with Kerosene) (plus 20% underflow-fines) | 2 | 1.5 | 1.1 |
| (6) Treated cuttings (with IPAR3) (plus 10% underflow-fines) | 1 | 1 | 0.58 |
| (7) Treated cuttings (with Kerosene) (plus 10% underflow-fines) | 1 | 0.5 | 0.29 |

Example 3

A Comparison of Synthetic Oil and Non-Synthetic Oil in Off-Shore and On-Shore Samples In this example three carrier oils were tested, IPAR3 (oil carrier #1), diesel (oil carrier #2) and a basically one to one mixture of diesel and IPAR3 (carrier oil #3).

The testing conditions were as described in Example 2, except that the sample was not heated and the extraction procedure was centrifugation alone. In one of the tests the sample was pre conditioned with the surfactant in a diesel carrier oil, using the preconditioning step previously described (2Plus). The results of these test are shown below in Table 3.

TABLE 3

Summary of Test Results Using Different Carrier Oils
and On- and Off-Shore Samples

| Sample | Carrier Oil | % Oil in centrifuge discharge | % Solids in recovered oil |
|---|---|---|---|
| Onshore | 1 | 2.6 | 1.8 |
| Onshore | 3 | 2.04 | 1.7 |
| Onshore | 2 | 1.3 | 1.4 |
| Onshore | 2Plus | 1.07 | 1.6 |
| Offshore B | 1 | 1.7 | 1.4 |
| Offshore B | 2 | 1.25 | 1.6 |
| Offshore A | 1 | 1.92 | 1.5 |
| Offshore B | 2 | 1.15 | 1.8 |

These results do not include the vacuum extraction step which could follow the centrifugation step and if included would most certainly remove the remaining oil to essentially a concentration lower than 1%.

Example 4

Pilot Plant Testing

The sample for this pilot plant testing was material from an open storage pit containing: well bore cuttings contaminated with underflow from drill mud centrifugation, some water based well cuttings along with drill mud tanks of low gravity solids as well as natural contamination.

The approximate daily input of the material to be treated is shown below in Table 4. Included in this Table is approximately 20 cubic meters of material that was treated in trial runs, before the equipment was running at capacity.

TABLE 4

Quantity of Material Treated

| Date | Cubic Meters Treated | Tonnes Treated (SG 2.00) |
|---|---|---|
| Day 1 | 19 | 38 |
| Day 2 | 16 | 32 |
| Day 3 | 12.5 | 25 |
| Day 4 | 13 | 26 |
| Day 5 | 19 | 38 |
| Day 6 | 18.5 | 37 |
| Day 7 | 19 | 38 |
| Day 8 | 15 | 30 |
| Day 12 | 27 | 54 |
| Day 13 | 23 | 46 |
| Day 14 | 33 | 66 |
| Day 15 | 15 | 30 |
| Day 16 | 21 | 42 |
| Day 17 | 29 | 58 |
| Day 18 | 36 | 72 |
| Day 19 | 37.5 | 75 |
| Day 20 | 20 | 40 |
| Day 21 | 26.5 | 53 |
| Day 22 | 43.5 | 87 |
| Day 23 | 20 | 40 |
| Day 24 | 44 | 88 |
| Day 25 | 47.5 | 95 |
| Day 26 | 48 | 96 |
| Trial Runs | 20 | 40 |
| Total # cubic meters treated = 623 | | Total # tonnes Treated = 1246 |

In this example the material to be treated was pre conditioned by adding 6 liters of the surfactant and oil carrier, containing 1% surfactant mixture, per ton of solid material. The pre conditioning step took place in the pump means, identified by reference numeral 12 in FIG. 1. To the solid material, before entering the centrifuge, was added via a chemical feed, a 1% surfactant mixture in the oil carrier. Approximately 6 liters of surfactant mixture was added per minute. The solid material was added at a rate of about 9 tons per hour. This rate is approximately twice the capacity of the system designed to remove oil to a level of about 1%, or lower. During this test, it was required that the residual oil levels be below 3% by weight. If necessary we had the ability to maintain residual oil levels to less than 0.5%, but for the sake of expediency, and the volume of material to be treated, we elected to raise our residual by increasing our material processed. The test results are shown in Table 5.

Due to the high level of low gravity solids the sample was pre filtered to separate such solids from the other material to be treated. The sample was treated using the apparatus shown in FIG. 1.

The total material treated was 623 cubic meters. To this material 17,025 liters of diesel carrier oil was used and 4800 liters of the surfactant mixture, as described in previous examples, were consumed. A total of about 208,519 liters of oil was recovered and 20 trucks (approximately 623 cubic meters) of treated solids was taken to land fill.

TABLE 5

Test Results

| Date | Residual oil concentration |
|---|---|
| Pre - trial | 0.66%, 0.92% |
| Pre - trial | 2.5% |
| Pre - trial | 2.8% |
| Day 1 | 2.5%, 2.5%, 2.7% |
| Day 2 | 2.77%, 2.48%, 2.13% |

TABLE 5-continued

Test Results

| Date | Residual oil concentration |
| --- | --- |
| Day 3 | 2.16%, 2.18%, 2.2% |
| Day 4 | 1%, 0.78%, 1.8%, 1.6%, 0.78%, 1.55%, 1.37% |
| Day 5 | 1.4%, 1.6%, 2.26%, 1.55%, 1.57%, 2.4%, 1.57% |
| Day 6 | 1.6%, 1.55%, 2.5% |
| Day 7 | 1.3%, 3.2%, 2.66%, 1.5%, 3%, 2% |
| Day 8 | 1.37%, 1.54% |
| Day 12 | 1.24%, 0.9%, 2.6%, 2.26%, 2.4% |
| Day 13 | 2.24%, 3%, 3% |
| Day 14 | 1.55%, 1.9%, 2.66% |
| Day 15 | 1.9% |
| Day 16 | 1.92%, 2.8%, 1.92% |
| Day 17 | 1.9%, 1.2%, 2.24% |
| Day 18 | 0.96%, 0.918%, 1.9%, 1.26%, 1.27% |
| Day 19 | 1.9%, 1.6%, 1.4%, 1.55%, 0.92% |
| Day 20 | 0.9%, 1.85%, 2.3%, 1.55% |
| Day 21 | 0.6%, 2.3% |
| Day 22 | 1.26%, 1.24%, 2.9%, 1.58%, 1.24% |
| Day 23 | 1.4%, 1.57%, 1.92%, 1.57%, 2.25%, 2.6% |
| Day 24 | 0.94%, 1.9%, 2.26%, 2.26% |
| Day 25 | 1.26%, 1.92%, 1.94%, 1.59%, 1.6% |
| Day 26 | 1.22%, 2.76%, 1.41%, 1.4%, 1.4%, 1.4% |

In order to access the efficiency of the pilot plant test, the system was slowed down to a feed rate of about 3 to 4 tons per hour, at selected times during the pilot plant test. During these periods the amount of oil remaining in the treated solids was approximately 0.6% (note the first sample on Day 21 for example).

The present invention has been described with regard to preferred embodiments. However, it will be understood to persons skilled in the art that a number of variations and modifications can be made without departing from the scope of the invention as described in the followings claims.

The embodiments of the invention in which an exclusive property of privilege is claimed are defined as follows:

1. A method of extracting oil from oil contaminated solids-containing material comprising:
   mixing the oil contaminated solids-containing material with a surfactant consisting of a mixture of myristic alcohol, lauryl alcohol and ethoxylated lauryl alcohol in an oil carrier to provide a solids-containing treated material; and
   subjecting the solids-containing treated material to one or more separating steps to extract oil therefrom and to provide an oil-depleted solids-containing material wherein the carrier oil is characterized as being an oil from about C12 to about C22 and wherein the surfactant has a hydrophilic-lipophilic balance (HLB) of less than 8.

2. The method of claim 1, wherein the surfactant is initially combined in the oil carrier at a concentration of myristic alcohol 1% to 5% (weight percent) and ethoxylated lauryl alcohol 10% to 30% (weight percent).

3. The method of claim 1, wherein the surfactant is added to the carrier oil at concentration range from 0.25% to 20% by volume.

4. The method of claim 1, wherein from about 50 ml to about 1000 ml of surfactant in the oil carrier is used to treat about 1 ton of oil contaminated material.

5. The method of claim 1, wherein the carrier oil is a synthetic oil, selected from the group consisting of Low Tox Mineral Oil and IPAR3; a non-synthetic oil selected from the group consisting of kerosene, diesel, mineral oil and cutter stock; and mixtures thereof.

6. The method of claim 1, wherein the oil is separated from the treated material by a separation means selected from the group consisting of: vacuum filtration, air stripping, centrifugation, cyclones and any combination thereof.

7. The method of claim 1, wherein said one or more separating steps include applying extraction forces to said treated material.

8. The method of claim 7, wherein said forces include centrifugal forces.

9. The method of claim 8, wherein said centrifugal forces effect a partial separation of the oil from the solids contained in said material, said solids being further treated to further remove the oil therefrom.

10. The method of claim 9, wherein said further treatment step comprises applying suction forces to the treated material by way of a vacuum extraction procedure.

11. The method of claim 10, wherein said centrifugal forces are applied by passing the solids-containing treated material through a centrifuge, collecting the oil removed by the centrifugal forces and passing the remaining solids-containing material outwardly of said centrifuge.

12. The method of claim 11, wherein the material passing outwardly of said centrifuge is made to pass through a vacuum extractor whereby to remove by suction oil remaining in the solids-containing material.

13. The method of claim 7, wherein said extraction forces comprise suction forces which are applied by way of a vacuum extractor.

14. The method of claim 13, wherein the vacuum extraction procedure includes passing the materials over a vacuum tray, while supported on a filter belt means, to which suction is applied, collecting the extracted oil, and passing the oil-depleted solids-containing materials outwardly of the vacuum tray.

15. The method of claim 7 including heating the material being treated sufficiently to enhance the separation of the oil therefrom during the separating step(s).

16. The method of claim 7, wherein the oil contaminated solids-containing material is obtained from land-based drilling and contains chloride ions, and further treating the oil-depleted material after said separating steps to reduce the concentration of chloride ions in the material.

17. The method of claim 16 wherein the step of further treating the oil-depleted material comprises contacting said material with a solution of dioctyl sodium sulfosuccinate in water and separating the further treated material from the resulting water solution of dioctyl sodium sulfosuccinate and chloride ions.

18. The method of claim 17, wherein the concentration of dioctyl sodium sulfosuccinate in the water ranges from about 0.25% to about 15% by volume.

19. The method of claim 17, wherein the volume of the dioctyl sodium sulfosuccinate water solution required is from about 1 to about 20 times the volume of oil-depleted material to be treated.

20. A method of extracting oil from oil contaminated solids-containing material comprising:
   mixing the oil contaminated solids-containing material with a combination of one or more surfactants, wherein the surfactant has a hydrophilic-lipophilic balance (HLB) of less than 8 and wherein the surfactant is more soluble in oil than in water, in a carrier oil, wherein said carrier oil is characterized as being an oil from about C12 to about C22, to provide a solids-containing treated material; and
   subjecting the solids-containing treated material to one or more separating steps to extract oil therefrom and to provide an oil-depleted solids-containing material.

* * * * *